(12) United States Patent
Sguinzi

(10) Patent No.: US 7,472,947 B2
(45) Date of Patent: Jan. 6, 2009

(54) SYSTEM FOR SECURING A MONOBLOCK WINDOW TO A VEHICLE BODY

(75) Inventor: Angelo Sguinzi, Magenta (IT)

(73) Assignee: Sguinzi Pietro S.p.A. (IT)

( * ) Notice: Subject to any disclaimer, the term of this patent is extended or adjusted under 35 U.S.C. 154(b) by 0 days.

(21) Appl. No.: 10/579,012

(22) PCT Filed: Nov. 11, 2003

(86) PCT No.: PCT/IT03/00731

§ 371 (c)(1),
(2), (4) Date: Jun. 14, 2006

(87) PCT Pub. No.: WO2005/044608

PCT Pub. Date: May 19, 2005

(65) Prior Publication Data

US 2007/0039255 A1    Feb. 22, 2007

(51) Int. Cl.
*B60J 7/00* (2006.01)
(52) U.S. Cl. .......................... 296/201; 52/208
(58) Field of Classification Search ................ 296/201, 296/146.15, 146.5; 52/208, 204.597, 202; 49/502, 440, 490.1
See application file for complete search history.

(56) References Cited

U.S. PATENT DOCUMENTS

| | | | | |
|---|---|---|---|---|
| 2,280,389 A | | 4/1942 | Edwards ...................... 189/75 |
| 2,610,714 A | * | 9/1952 | Bradley ................. 52/204.597 |
| 3,155,204 A | * | 11/1964 | Leslie et al. .................. 52/208 |
| 3,274,740 A | * | 9/1966 | Hall ............................. 52/208 |
| 3,759,004 A | | 9/1973 | Kent ........................... 52/400 |
| 4,007,536 A | * | 2/1977 | Soderberg .............. 52/204.597 |
| 4,121,379 A | * | 10/1978 | Everson ....................... 52/202 |
| 4,278,286 A | * | 7/1981 | Kiba et al. ..................... 296/93 |
| 4,405,174 A | * | 9/1983 | Yamane et al. .............. 296/201 |
| 4,434,593 A | * | 3/1984 | Horike et al. ................. 52/208 |
| 4,450,661 A | * | 5/1984 | Whitener ..................... 52/208 |
| 4,616,456 A | * | 10/1986 | Parker ......................... 52/202 |
| 4,627,201 A | * | 12/1986 | Hamamoto et al. ........... 52/208 |
| 4,646,492 A | * | 3/1987 | Fujikawa ..................... 52/208 |
| 4,800,681 A | * | 1/1989 | Skillen et al. ................. 49/440 |
| 4,897,975 A | * | 2/1990 | Artwick et al. ............... 52/208 |

(Continued)

FOREIGN PATENT DOCUMENTS

DE          44 02 477         8/1995

(Continued)

OTHER PUBLICATIONS

International Search Report PCT/IT2003/000731 dated Jul. 6, 2004.

*Primary Examiner*—Kiran B. Patel
(74) *Attorney, Agent, or Firm*—Ostrolenk, Faber, Gerb & Soffen, LLP

(57) ABSTRACT

A system for securing a window to a vehicle body, comprising a support body consisting of a window chassis supporting an outer glass, said system further including a counterchassis fit to connect said support body to said vehicle body, wherein said counterchassis further includes a draw piece with at least an outer portion and at least an inner wing, said outer portion and said inner wing being interconnected, and wherein said outer portion is substantially coplanar to said outer glass.

11 Claims, 2 Drawing Sheets

U.S. PATENT DOCUMENTS

| | | | |
|---|---|---|---|
| 4,986,867 A * | 1/1991 | Braendle et al. | 296/201 |
| 5,149,168 A * | 9/1992 | Yada et al. | 296/201 |
| 5,174,623 A * | 12/1992 | Yada et al. | 296/93 |
| 5,413,397 A * | 5/1995 | Gold | 296/146.15 |
| 5,442,880 A * | 8/1995 | Gipson | 49/413 |
| 5,492,387 A * | 2/1996 | Yada et al. | 52/204.597 |
| 5,522,191 A * | 6/1996 | Wenner et al. | 296/201 |
| 5,529,366 A * | 6/1996 | Gold | 296/146.15 |
| 5,620,794 A * | 4/1997 | Burkart et al. | 296/201 |
| 5,669,131 A * | 9/1997 | Gold | 52/204.597 |
| 5,718,470 A * | 2/1998 | Yada et al. | 296/208 |
| 5,988,730 A * | 11/1999 | Bekaert | 296/146.15 |
| 6,257,644 B1 * | 7/2001 | Young | 296/93 |
| 6,551,673 B1 * | 4/2003 | Yamamoto et al. | 296/146.15 |
| 6,871,450 B2 * | 3/2005 | Repp et al. | 49/398 |
| 7,073,842 B2 * | 7/2006 | Kagawa | 296/146.15 |
| 2002/0011040 A1 * | 1/2002 | Adachi et al. | 52/204.597 |
| 2003/0024182 A1 * | 2/2003 | Yeany | 52/204.597 |
| 2007/0039255 A1 * | 2/2007 | Sguinzi | 52/208 |

FOREIGN PATENT DOCUMENTS

| | | |
|---|---|---|
| EP | 0 152 045 | 8/1985 |
| EP | 0 096 129 | 6/1988 |

\* cited by examiner

SYSTEM FOR SECURING A MONOBLOCK WINDOW TO A VEHICLE BODY

CROSS REFERENCE TO RELATED APPLICATION

The present application is a 35 U.S.C. §§ 371 national phase conversion of PCT/IT2003/000731, filed 11 Nov. 2003, which is herein incorporated by reference. The PCT International Application was published in the English language.

BACKGROUND OF TILE INVENTION

The present invention relates to a system for securing a window to a vehicle body.

SUMMARY OF THE INVENTION

The invention is particularly applicable to windows of the type normally used on vehicles meant for passenger transportation.

In general, the windows consist of a framework comprising two sections of glass or plate glass. A first fixed section is integral with the vehicle body opening.

The moving section partially or totally overlaps said adjacent fixed glass.

Several systems for securing windows to the vehicle body opening are known; in such systems, the outer glass is installed on a metal chassis which differs in shape and size depending on the kind of connection used to implement the securing itself.

A first known system envisages the use of a counterchassis to oppose the chassis supporting the outer glass; such counterchassis rests on the inner part of the vehicle body opening and is connected to the former through fastening means such as clamp screws.

Such method was chosen because it allows an easy disassembly of the window glass framework and facilitates operations of maintenance and/or replacement of the same.

It also provides a wide tolerance in the selection of the materials used at the design stage for the implementation of the profiles of said chassis.

However, even considering such benefits, said prior art system has a considerable drawback. As a matter of fact, it implements a body side profile which appears to be significantly heavy due to the interposition of projecting metal draw pieces.

As a consequence, seen from the outside, the body side of a vehicle using a window securing system of the type described above does not appear to meet the needs for pleasant look and careful finishing which are currently wished by users, requiring the coplanarity between the glass surface and the vehicle outer body.

A second known securing system differs from the first one since the chassis supporting the outer glass does not rest on the outer surface of the vehicle body side, but is directly connected to the inner counterchassis.

In order to ensure the proper distribution of stresses and the stability of the framework, the outer glass is glued to the outer surface of the vehicle body opening.

Such securing method ensures the desired planarity between the surface of the outer glass and the outer surface of the vehicle body opening, thus providing the assembly with a streamlined design, not made heavier by projecting metal draw pieces.

This brief analysis clearly shows, however, that also such second system presents a significant problem, namely the considerable increase of the costs for the window maintenance and disassembly.

As a matter of fact, this system envisages the use of steady connection means, thus involving an extension of the time needed to remove such connection means, as well as an increase of the costs for the material being used.

The problem which the present invention means to tackle is the implementation of an securing system ensuring an optimal streamlined style along with user-friendliness, without however bringing prejudice to the illuminance of the glass surface.

Such problem is solved by a system for securing a window to a vehicle body according to claim 1, to which reference is made for the sake of brevity.

The invention is described in detail here below, by way of example but not by way of limitation, reference being made to the attached drawings, wherein:

DESCRIPTION OF A PREFERRED EMBODIMENT

Figure 1:
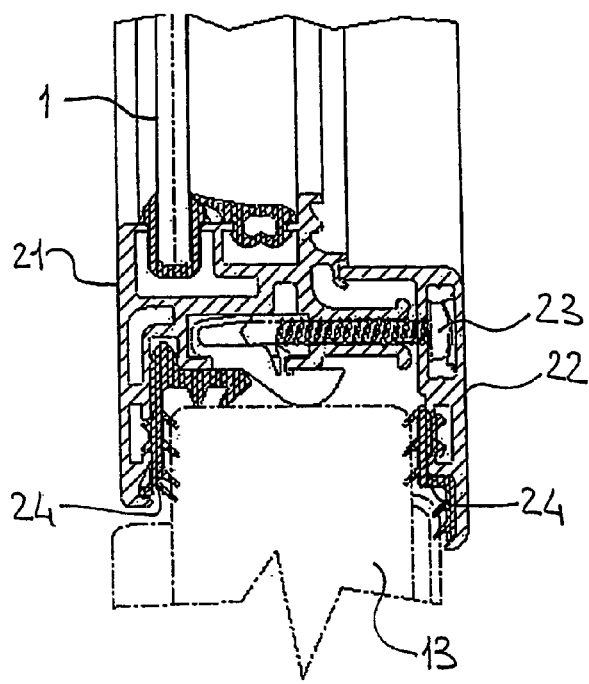
FIG. 1 shows a sectional view of a first system for securing a window, along a vertical plane perpendicular to the vehicle body side, according to prior art.

In particular FIG. 1, depicting a first securing system according to prior art, highlights the outer glass 1, mounted on the chassis 21 which is connected to the counterchassis 22 through clamp screws 23; the system is installed on the vehicle body opening 13 by interposing shims 24.

Figure 2:
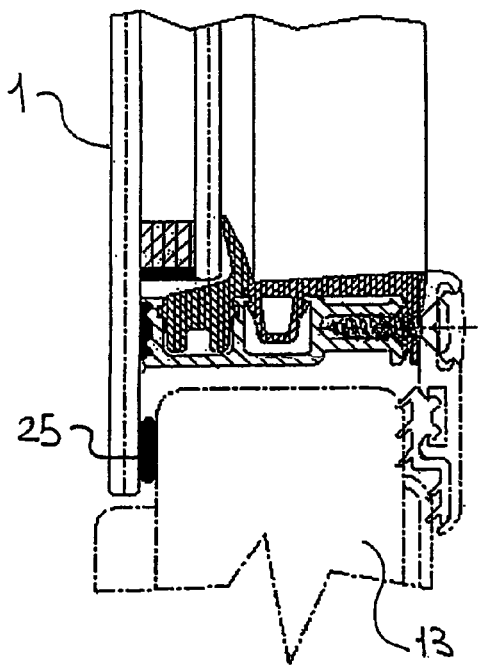
FIG. 2 shows a sectional view of a second system for securing a window, along a vertical plane perpendicular to the vehicle body side, according to prior art.

FIG. 2, depicting a second securing system according to prior art, highlights the gluing 25 through which the glass 1 is connected to the vehicle body opening 13.

The securing system which is the subject-matter of the present invention is used to implement the upper part of the window framework.

An illustrative embodiment of the system for securing a window to a vehicle body according to the present invention is shown in its entirety under reference number 10.

Figure 3:
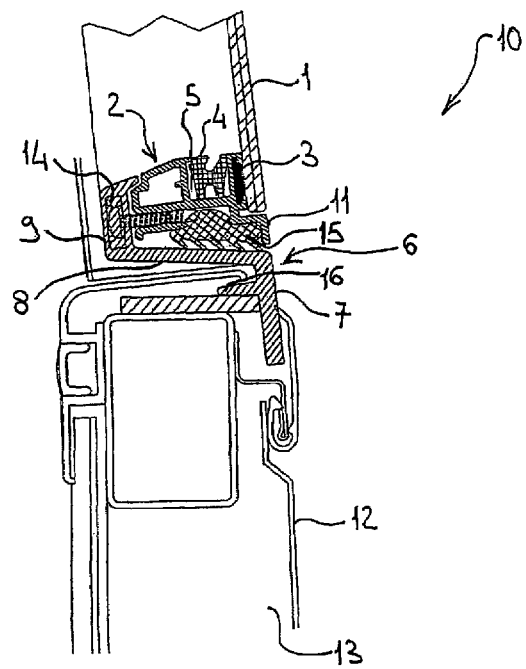
FIG. 3 shows a sectional view of the system for securing a window, along a vertical plane perpendicular to the vehicle body side, according to the present invention.

The securing system 10 comprises, as illustrated in FIG. 3, an outer glass 1 which is supported by a window chassis 2 and which can, by way of example, be glued thereto 3.

A gasket for condensate recovery 4 can be included among said elements and housed within a specially-shaped throat 5 formed into the profile of the window chassis 2.

FIG. 3, referring to the upper part of the window, whereas the previous figures relate to the lower part, also shows a Z-shaped draw piece 6; this consists of an outer portion 7 and an inner wing 9, both connected by a stem 8, the whole forming a single piece.

Such Z-shaped draw piece 6 is fit, as will be better illustrated below, to implement a connection with the window framework, consisting of the window chassis 2 and the outer glass 1.

Said Z-shaped draw piece 6 is provided with special steps and notches allowing it to be steadily fixed to the vehicle body opening 13 through gluing or through mechanical connection means.

The outer portion 7 of the Z-shaped draw piece 6 is formed so as to be coplanar at the same time to the outer glass 1, to the surface of the vehicle body outer side 12 and to any possible outer profile 11 of the window chassis 2.

In this way the desired streamlined style is obtained, while keeping the stability of the structure as a whole.

The inner wing 9 of the Z-shaped draw piece 6 includes a housing 14 for the screws, allowing the window chassis 2 to be fastened to said draw piece 6.

The window chassis 2 is also connected to the draw piece 6 through the interposition of the gasket 15 fit to provide the centering, the watertightness and the support of the window framework in the opening.

It is also possible, should the particular shape of the vehicle body opening require so, provide the Z-shaped draw piece 6 with a fastening foot 16 in order to improve the structural stability of the securing system, as illustrated in FIG. 3.

Figure 4:
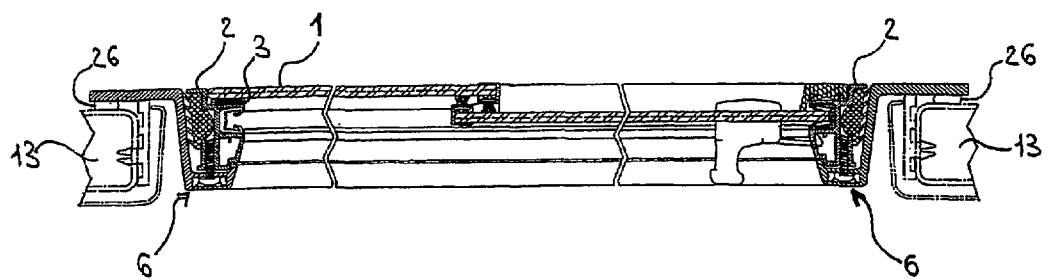
FIG. 4 shows a horizontal sectional view, perpendicular to the vehicle body side, of the system for securing a window, turned towards the lower draw piece of the frame of the window itself, according to the present invention.

Lastly, FIG. 4 shows a horizontal sectional view of the upper portion of the window framework, to which the securing system which is the subject-matter of the present invention is applied. The following elements stand out therein: the outer glass 1, the window chassis 2 to which said glass 1 is fastened through gluing 3 and the Z-shaped draw piece 6 connected to the vehicle body opening 13, in a particular example of embodiment, through gluing 26.

As can be inferred from the description, the preparation of said Z-shaped draw piece 6 allows the glass to be assembled and disassembled without incurring the above problems due to the gluing between the glass and the vehicle body.

The system of the invention is, however, very inexpensive and cost-effective.

From the foregoing it appears obvious that the inventive concepts set forth are not limited to the illustrated application example, but can be advantageously adjusted to other, similar applications. The present invention is therefore open to a number of modifications and variations, all falling within the inventive concept set forth in the claims attached hereto, whereas the technical details can change depending on specific needs.

The invention claimed is:

1. A system for securing a window including an outer glass to a vehicle body, the system comprising:
   a window chassis configured to support the outer glass;
   a glue element for gluing the outer glass to the window chassis;
   a counterchassis configured and positioned to connect said window chassis to said vehicle body, wherein said counterchassis is glued to said vehicle body and includes a draw piece with at least an outer portion and at least an inner wing, said outer portion and said inner wing being interconnected, wherein said outer portion is substantially coplanar to said outer glass; and
   a reversible fastener configured and positioned to connect said draw piece to the window chassis.

2. The system according to claim 1, wherein said draw piece is substantially Z-shaped.

3. The system according to claim 1, wherein said outer portion of said draw piece is shaped so as to be coplanar also to an outer profile of said window chassis.

4. The system according to claim 1, wherein said inner wing of the draw piece includes a housing for the means used to fasten the window chassis to said draw piece.

5. The system according to claim 1, wherein said window chassis is connected to the draw piece via a gasket configured to provide centering, watertightness and support of the window framework.

6. The system according to claim 1, wherein said draw piece is provided with a fastening foot to improve the structural stability of the system.

7. The system according to claim 1, wherein said draw piece is provided with steps and notches configured to provide a connection to an opening in the vehicle body through gluing.

8. The system according to claim 1, further comprising a gasket for condensate recovery, said gasket being housed within a specially-shaped throat formed into a profile of the window chassis.

9. The system according to claim 1, wherein said draw piece consists of a single piece.

10. In combination, the system according to claim 1 and the outer glass.

11. In combination, the system according to claim 1 and the vehicle body.

* * * * *